United States Patent [19]

Ikura et al.

[11] Patent Number: 5,283,217
[45] Date of Patent: Feb. 1, 1994

[54] PRODUCTION OF HIGHLY DISPERSED HYDROGENATION CATALYSTS

[75] Inventors: Michio Ikura, Kanata; Maria Stanciulescu, Orleans; James E. Kelly, Nepean, all of Canada

[73] Assignee: Energy, Mines & Resources - Canada, Ottawa, Canada

[21] Appl. No.: 896,976

[22] Filed: Jun. 11, 1992

[51] Int. Cl.$^5$ .............................................. B01J 31/00
[52] U.S. Cl. .................................... 502/167; 502/150; 502/168; 502/173
[58] Field of Search ................. 502/150, 167, 168, 173

[56] References Cited

U.S. PATENT DOCUMENTS

| | | | |
|---|---|---|---|
| 4,102,775 | 7/1978 | Quarderer et al. | 208/10 |
| 4,136,013 | 1/1979 | Moll et al. | 208/10 |
| 4,369,106 | 1/1983 | Aldridge et al. | 208/10 |
| 4,376,037 | 3/1983 | Dahlberg et al. | 208/111 |
| 4,379,744 | 4/1983 | Rosenthal et al. | 208/10 |
| 4,428,820 | 1/1984 | Kuehler et al. | 208/10 |
| 4,567,156 | 1/1986 | Bearden, Jr. et al. | 502/173 |
| 4,954,473 | 9/1990 | Gatsis | 502/173 |

Primary Examiner—Patrick P. Garvin
Assistant Examiner—E. D. Irzinski

[57] ABSTRACT

A novel micro-emulsion is described which is useful as a hydrogenation catalyst. The highly dispersed hydrogenation catalyst is prepared by forming an aqueous solution of a salt of a transition metal and a surfactant, adding this solution to heated petroleum pitch or a mixture thereof with a petroleum distillate, such as heavy gas oil, and mixing vigorously until a stable water-in-oil micro-emulsion is formed having an average diameter of less than about 1500 Å, which upon exposure to severe reducing conditions produces catalyst particles having an average size of less than about 500 Å. The micro-emulsion thus formed is highly stable and has a long shelf-life and the catalyst particles formed under hydrogenation conditions are much smaller than previously reported.

18 Claims, No Drawings

PRODUCTION OF HIGHLY DISPERSED HYDROGENATION CATALYSTS

BACKGROUND OF THE INVENTION

This invention relates to an improved method whereby a hydrogenation catalyst is conveniently and effectively dispersed in and contacted with a reaction mixture. It relates particularly to a method for making a stable water-in-oil micro-emulsion containing finely dispersed catalyst or catalyst precursor particles and to a hydrogenation process utilizing the micro-emulsion.

DESCRIPTION OF THE PRIOR ART

As the production of conventional crude oil declines and that of heavy oil increases, there is a growing need to upgrade heavy hydrocarbon oils. All primary upgrading processes, such as coal liquefaction, hydrocracking and coal-oil coprocessing, require catalyst for efficient hydrogenation. Typical operating conditions for primary upgrading through hydrogenation range from 425° C. to 460° C. and above about 13.9 MPa (2000 psig) in temperatures and pressures respectively. In the case of coal liquefaction and coal-oil coprocessing, ash forming components in feed coal, such as iron oxide and pyrite, are transformed to catalytically active species under the severe reducing conditions and they have the capability of enhancing coal and pitch conversions. However, because the effectiveness of the catalysis by the indigenous catalyst-forming component is hampered by the catalyst particle diameters and concentrations and the concentrations of the catalyst-forming components vary from coal to coal as well as from coal seam to coal seam at the same coal mining site, it is preferable to add catalyst or catalyst precursors for better control of the primary upgrading reactions. Basically two types of catalysts are used: supported or dispersed catalyst.

Many commercial hydrogenation catalysts are of the supported type; catalytically active metals are deposited on the inner surface of substrate micropores forming catalytically active sites. Normally, the surface area of the substrate is very large and, therefore, the catalyst activity per unit volume of supported catalyst is also very high. When supported catalysts are used in the hydrogenation of large hydrocarbon molecules, such as coal recycle oil, heavy oil and vacuum bottoms, catalyst pores must be large enough to allow the diffusion of large hydrocarbon molecules to the catalytically active sites. In such an application, a supported catalyst tends to be deactivated by metal deposition and coke laydown on the catalyst surface. Deactivated catalyst particles must be withdrawn and replaced with a fresh or regenerated catalyst. It must be noted that supported catalysts are an expensive commodity and care must be given to prevent catalyst deactivation.

The use of dispersed catalysts can circumvent the above problems; their activation is not of concern because the catalyst particles are transported out of the reactor with the reactant. Surface area provided by the dispersed catalysts, however, is not normally as large as that for supported catalysts. Moreover, when expensive or environmentally toxic metals are used as dispersed catalysts, the recycle of these metals may become imperative.

The performance of a given dispersed catalyst depends on two factors; (i) the degree of dispersion, i.e. the surface area available for catalysis which is proportional to the power 2 to the catalyst particle diameter and (ii) the inherent effectiveness for catalysis. The dispersed catalysts have been used from the very beginning of synthetic oil production from coal. For instance, materials such as molybdenum oxide and iron oxide dust with sulphur have been used in commercial plants in Germany and Great Britain before and during World War II. Red mud, which is a by-product from the aluminum industry, has also been used as an inexpensive source of iron oxide. Transition metals are now widely used as dispersed catalysts and, for instance, molybdenum, vanadium, nickel and iron are commonly added to coal-oil slurries as catalyst precursors in the formation of organometallics, or salts or oxides or sulphides.

It has been known from various patents, e.g. Ranganathan et al U.S. Pat. No. 4,214,977, that a metallic component can be loaded as a metal salt on feed coal in hydrocracking processes. In this mode of operation, coal liquifies at high temperature and pressure and the metal becomes well dispersed in the hydrogenation reactor. It has also been shown that inexpensive iron salts such as $FeSO_4$ and $FeCl_3$ can be loaded on coal to obtain highly active precursors in coal liquefaction.

When oil soluble organometallic compounds such as naphthenates, octonates and carbonyls decompose at high temperature to release a metallic component, they react with sulphur to form catalytically active fine particles. It has been reported that catalysts prepared from organometallic decomposition have extremely small diameters. Unfortunately, most of the organometallic compounds are too expensive for use as disposable catalyst precursors.

Quarderer et al U.S. Pat. No. 4,102,775 describes a conversion process for hydroconversion of hydrocarbonaceous material in the presence of a dispersed catalyst and Moll et al U.S. Pat. No. 4,136,013 describes the production of an emulsion catalyst for use in such hydrogenation processes. A metallic component is introduced as a salt in emulsion to form catalytically active fine particles in the order of 10 microns or less.

It is the object of the present invention to produce novel micro-emulsion catalysts in which catalyst particles are even more finely dispersed.

SUMMARY OF THE INVENTION

The present invention in its broadest aspect relates to a process for producing a highly dispersed hydrogenation catalyst by forming an aqueous solution of a salt of a transition metal and a surfactant, adding this solution to a heated petroleum pitch or a mixture thereof with a petroleum distillate, such as heavy gas oil, and mixing vigorously until a stable water-in-oil micro-emulsion is formed having an average diameter of less than about 1500 Å, which upon exposure to severe reducing conditions produces catalyst particles having an average size of less than about 500 Å. The salt of the transition metal in the micro-emulsion can be in the form of a catalyst precursor which forms the very small catalyst particles of less than 500 Å under the severe reducing conditions encountered during the hydrogenation.

It is a primary object of the present invention to obtain micro-emulsions of very small size and these emulsions have a most important characteristic of being highly stable. Thus, while normal emulsions possess a minimal stability, micro-emulsions are thermodynamically highly stable, i.e. no phase separation occurs even after long storage times.

The "petroleum pitch" or "pitch" referred to herein is typically a heavy hydrocarbon material at least 50% by weight of which has a boiling point above 525° C. It may typically be bitumen, natural heavy oil, heavy vacuum bottoms, etc.

For satisfactory results, most of these pitch materials must be mixed with a diluent. However, when the pitch is bitumen, such as that obtained from Athabaska tar sands, it may be processed according to the invention without an added diluent. This is because of the composition of these bitumens which typically contain approximately 9% naphtha, 22% light gas oil, 15% heavy gas oil and 54% vacuum bottoms. On the other hand, for heavier materials such as heavy vacuum bottoms, an added diluent must be used, such as a petroleum distillate. This distillate should be low in aromatic content and viscosity, and compatible with vacuum bottoms in terms of solubility and density. A preferred distillate for this purpose is a heavy gas oil having a boiling range of 335°–525° C.

For carrying out the mixing of the water and oil components of the emulsion, it is advantageous to adjust the densities of the petroleum pitch/distillate mixture and the salt-containing water to be approximately equal. This eliminates or reduces the possibility of phase separation due to density differences. Appropriate density adjustments may conveniently be made by using heavy gas oil as the distillate and adjusting the proportion of petroleum pitch to heavy gas oil.

The micro-emulsion also preferably includes a commercial ionic or non-ionic surfactant, e.g. a surfactant consisting of long aliphatic (lipophilic) and short hydroxy (hydrophilic) moieties. The surfactant alters the surface characteristics of the dispersed aqueous phase (emulsified phase) to be more amenable to that of the continuous oil phase. A surfactant layer formed between water and oil phases makes the two phases more compatible with each other. As a result, when a surfactant is not used, the dispersed phase produced by vigorous agitation or by any other means is not a stable micro-emulsion of the present invention but a simple emulsion.

It has been found that best results are obtained when the aqueous solution and petroleum pitch or petroleum pitch/heavy gas oil mixture are both heated to about 100° C. The surfactant is preferably used in an amount of less than 1% by weight, relative to the total weight of micro-emulsion and the petroleum pitch and heavy gas oil (when used) are normally mixed in the weight proportions 1.0:0.5 to 1.0:2.0, with a 1:1 ratio generally being preferred.

The transition metal salt is normally used in an amount of about 1 to 15% by weight and the salt may be selected from any of the transition metal salts including salts of molybdenum, vanadium, nickel, iron and zinc.

It may also in some instances be desirable to include a catalyst promoter in the micro-emulsion of the invention. The promoter is typically present in an amount of less than 2% by weight and may be selected from acidic compounds such as phosphoric acid, sulphuric acid and potassium dichromate or sulphur donors such as elemental sulphur, hydrogen sulphide, dimethylsulphoxide and thioacetanilide to promote the sulphiding of transition metals.

The invention also relates to a process for hydrogenating a hydrogenatable organic feedstock by contacting the feedstock with hydrogen in the presence of a transition metal-containing hydrogenation catalyst, with the catalyst being introduced in the form of the micro-emulsion of the present invention. The feedstock may be a heavy hydrocarbon oil, a coal slurry or an oil/coal slurry. The hydrogenation is typically carried out at temperatures in the range of 425° to 460° C. and pressures above about 13.9 MAPa. Under these conditions, the catalyst precursor in the micro-emulsion is converted to catalytic particles of exceedingly small size averaging less than about 500 Å and, in many instances, less than 300 Å.

DESCRIPTION OF THE PREFERRED EMBODIMENTS

The advantages of the present invention will be readily apparent from a consideration of the following examples.

EXAMPLE 1

Micro-emulsions were prepared using Cold Lake vacuum bottoms and a heavy gas oil. The Cold Lake vacuum bottoms had the characteristics shown in Table 1 below:

TABLE 1

| Characteristics of Cold Lake Vacuum Bottoms | |
|---|---|
| Specific gravity 15/15 C | 1.038 |
| Conradson carbon | 17.1% |
| Pentane insoluble (PI) | 23.48% |
| Toluene insoluble (TI) | 0.2% |
| Viscosity (Poise) | |
| at 80 C | 249.12 |
| at 110 C | 21.59 |
| Distillate (−525 C) | 16.8% |
| Residue (+525 C) | 83.2% |
| Elemental analysis (wt %) | Metal Content (ppm) |
| C    78.6% | Fe    18 |
| H    9.3% | Ni    93 |
| S    5.5% | V    235 |
| N    0.6% | |
| Ash    0.0% | |

The heavy gas oil had the following properties:

TABLE 2

| | | Elemental analysis | |
|---|---|---|---|
| Boiling range | 335–525° C. | C | 86.0% |
| Specific gravity | 0.98 | H | 10.5 |
| Viscosity | | N | 0.7 |
| @ 40° C. | 100 cSt | S | 2.3 |
| @ 112° C. | 5 cSt | | |

To make the micro-emulsions of the invention, equal portions of the vacuum bottoms and heavy gas oil were mixed and heated to a temperature of about 100° C.

The aqueous phase was formed by dissolving $FeSO_4 \cdot 7H_2O$ in water with a small quantity of Igepal DM-790 as surfactant. For some tests, $K_2Cr_2O$ was also added as a promoter. The aqueous phase was also heated to about 100° C.

The aqueous solution at pH 3.0–4.0 was then added to the vacuum bottoms/heavy gas oil mixture and stirred vigorously. This was carried out for a period of about 15 minutes using a Brinkmann homogenizer or for about 20 minutes when using a high shear mechanical mixer. When cooled to room temperature the emulsions formed were found to be stable for extended periods of time of greater than six months. Examples of the emulsion preparations are shown in Table 3 below.

TABLE 3

| Test # | Composition of Micro-Emulsions | | | | | | | Surfactant (wt %) |
|---|---|---|---|---|---|---|---|---|
| | Organic part (wt %) | | | | Inorganic part (wt %) | | | |
| | $C_6H_{12}$ | Naphtha | HGO | Pitch | $H_2O$ | Catalyst | Cat. Promoter | |
| 1 | 50.0 | — | — | — | 38.4 | 11.5 | — | 0.1 |
| 2 | — | — | 50 | — | 38.4 | 11.5 | — | 0.1 |
| 3 | — | — | 39.3 | 39.3 | 12.1 | 9.16 | — | 0.24 |
| 4 | — | 49.87 | — | — | 49.87 | | — | 0.34 |
| 5 | — | — | 37.1 | 37.1 | 17.0 | 8.46 | — | 0.34 |
| 6 | — | — | 36.9 | 36.9 | 17.0 | 8.46 | 0.40 | 0.34 |
| 7 | — | — | 36.6 | 36.6 | 17.0 | 8.46 | 1.12 | 0.34 |
| 8 | — | — | 46.4 | 46.4 | 6.0 | 0.85 | 0.10 | 0.34 |
| 9 | — | — | 36.8 | 36.8 | 17.0 | 8.4 | 0.66 | 0.34 |

Temperatures between 70° and 85° C. were used for Tests 2 to 9 in the above table, while Test 1 was made at 50° and heated to 70° C. for phase inversion. Test 1 represented a repeat of what was known in the art.

The above micro-emulsions were studied for stability and the results obtained are shown in Table 4 below:

TABLE 4

| Stability of Resulting Micro-emulsions | | |
|---|---|---|
| Test No. | Emulsion Type | Stability (h) |
| 1 | w/o | 288+ |
| 2 | No micro-emulsion | |
| 3 | w/o | 300+ |
| 4 | No micro-emulsion | |
| 5 | w/o | 2400+ |
| 6 | w/o | 2400+ |
| 7 | w/o | 2400+ |
| 8 | w/o | 2400+ |
| 9 | w/o | 2400+ |

EXAMPLE 2 (COMPARATIVE EXAMPLE)

In order to determine the effect of pH on the formation of micro-emulsions, the tests of Example 1 were repeated with the pH of the aqueous solution increased to the range of 9.5-10.0. This was done by the addition of $NH_4OH$.

The compositions of the micro-emulsions are shown in Table 5 below:

TABLE 5

| Test # | Composition of Micro-Emulsions | | | | | | | Surfactant (wt %) |
|---|---|---|---|---|---|---|---|---|
| | Organic part (wt %) | | | | Inorganic part (wt %) | | | |
| | $C_6H_{12}$ | Naphtha | HGO | Pitch | $H_2O$ | Catalyst | Cat. Promoter | |
| 1 | 61.5 | — | — | — | 38.25 | — | — | 0.25 |
| 2 | — | 76.27 | — | — | 10.8 | 13.3 | — | — |
| 3 | — | 49.87 | — | — | 49.87 | — | — | 0.25 |
| 4 | — | 43.36 | — | — | 43.36 | 13.04 | — | 0.25 |
| 5 | — | — | 17.74 | — | 69.87 | 12.29 | — | 0.1 |
| 6 | — | — | 28.25 | — | 52.11 | 19.54 | — | 0.1 |
| 7 | — | — | 30.5 | — | 56.25 | 13.39 | — | 0.1 |
| 8 | — | — | 66.57 | — | 24.24 | 9.09 | — | 0.1 |
| 9 | — | — | 36.81 | — | 51.86 | 11.08 | — | 0.25 |
| 10 | — | — | 46.14 | — | 46.13 | 7.4 | — | 0.33 |
| 11 | — | — | 60.97 | — | 33.88 | 4.74 | — | 0.41 |
| 12 | — | — | 57.27 | — | 31.73 | 10.58 | — | 0.42 |
| 13 | — | — | 34.28 | 29.10 | 24.25 | 12.13 | — | 0.24 |
| 14 | — | — | 36.6 | 36.6 | 16.9 | 8.4 | 1.12 | 0.34 |
| 15 | — | — | 37.01 | 37.01 | 17.03 | 8.5 | 0.1 | 0.34 |

The micro-emulsions formed were studied for stability and the results obtained are shown in Table 6 below:

TABLE 6

| Stability of Resulting Micro-emulsions | | |
|---|---|---|
| Test # | Emulsion Type | Stability (hr) |
| 1* | o/w | 1 |
| 2* | o/w | ~1 |
| 3* | o/w | ~1 |
| 4* | o/w | ~1 |
| 5* | o/w | 18 |
| 6 | o/w | 2 |
| 7 | o/w | 1 |
| 8 | o/w | 1 |
| 9 | o/w | 16 |
| 10* | o/w | 1 |
| 11 | o/w | 1 |
| 12 | w/o | 16+ |
| 13 | w/o | 18 |
| 14** | w/o | ~18 |
| 15 | w/o | ~20 |

*Emulsions unstable at a temperature higher than 50° C.
**Emulsion made at 50° C.

It will be seen that the basic solutions (high pH values) produce unstable emulsions. Phase separation occurred within 24 hours. Moreover, most of them were oil-in-water emulsions.

EXAMPLE 3

Hydrocracking tests were carried out using the micro-emulsions of this invention and a traditional iron salt on coal additive of the type described in U.S. Pat. No. 4,214,977, incorporated herein by reference. The iron was used in the form of $FeSO_4 \cdot 7H_2O$.

Hydrocracking of the Cold Lake vacuum bottoms was carried out in a 100 ml stainless steel tubing bomb in a fluidized sand bath. The tubing bomb was vigorously shaken by a mechanical system. The Cold Lake vacuum bottoms were mixed mechanically with a small amount of prepared emulsion and placed in the tubing bomb reactor. The reactor was thereafter flushed with hydrogen and pressurized to 55.46 MAPa (800 psig) at room temperature. The shaking was started at room temperature and heated to 70° to 100° C. and kept at this temperature range for approximately 10 minutes to allow hydrogen desolution in the feed mixture and for good reactant mixing. The reactor was submerged in the fluidized sand bath which was preheated to 450° C., and held at that temperature for 40 minutes. Upon completion of the reaction, the reactor was removed from the sand bath and cooled to below 200° C. in about 65 minutes. When the reactor temperature reached room temperature, the gases were collected in a gas bag.

For each test, 17.73 g of Cold Lake vacuum bottoms were used along with 2.27 g of micro-emulsion additive comprised of (A) 46.4% pitch, 46.4% HGO, 0.85% $FeSO_4.7H_2O$, 6% $H_2O$ and 0.34% surfactant (Ipegal DM-970) or (B) 37.1% pitch, 37.1% HGO, 8.46% $FeSO_4.7H_2O$, 17% $H_2O$ 0.34% surfactant, and 0.10% promoter ($K_2Cr_2O_7$).

The results obtained are shown in Table 7 below:

TABLE 7

Yields of Extracted Products Obtained with Different Catalytic Forms of $FeSO_4.7H_2O$

| Product (wt %) | No catalyst | USP 4,214,977 additive | Micro-emulsion additive | |
|---|---|---|---|---|
| | 0 ppm Fe | 2000 ppm Fe | Micro-emulsion A (200 ppm Fe only) | Micro-emulsion B (2000 ppm Fe only) |
| Pentane Soluble | 63.8 | 68.0 | 72.0 | 73.0 |
| Asphaltenes | 11.0 | 12.2 | 8.5 | 9.7 |
| Preasphaltenes | 0.7 | 1.0 | 3.7 | 1.0 |
| THFI | 16.0 | 11.3 | 7.5 | 11.0 |
| Gases | 9.6 | 10.7 | 10.8 | 10.0 |
| Total | 101.1 | 103.2 | 102.5 | 104.7 |

The extraction has been done by soxhlet extraction.
Time of extraction:

| Solvent | Time |
|---|---|
| Pentane, 150 mL | 24 h |
| Toluene, 150 mL | 30 h |
| THF, 150 mL | 24 h |

EXAMPLE 4

The procedure of Example 3 was repeated, but with the use of various catalyst promoters. For each test, 17.73 g of Cold Lake vacuum bottoms were used along with 2.27 g of micro-emulsion additives comprised of Micro-Emulsion B of Example 3; Micro-Emulsion C consisting of 36.9% pitch, 36.9% HGO, 8.46% $FeSO_4.7H_2O$, 17% $H_2O$, 0.34% surfactant (Ipegal DM-970) and 0.40% catalyst promoter ($K_2Cr_2O_7$) or Micro-Emulsion D consisting of 36.8% pitch, 36.8% HGO, 8.4% $FeSO_4.7H_2O$, 17% $H_2O$, 0.34% surfactant (Ipegal DM-970) and 0.66% catalyst promoter ($K_2SO_4$). The iron concentration for each test was 2000 ppm. The results obtained are shown in Table 8 below:

TABLE 8

Yields of Extracted Products Obtained Using Multi-components catalyst

| Product (wt %) | Micro-Emulsion B (Fe only) | Micro-Emulsion C (Fe + K + Cr) | Micro-Emulsion D (Fe + K) |
|---|---|---|---|
| Pentane Soluble | 73.0 | 76.2 (79.8) | 73.0 |
| Asphaltenes | 9.7 | 8.5 (6.0) | 2.9 |
| Preasphal- tenes | 1.0 | 0.6 (3.8) | 8.1 |
| THFI* | 11.0 | 7.7 (6.9) | 10.3 |
| Gases | 10.0 | 11.4 (—) | 9.9 |
| Total | 104.7 | 104.4 (—) | 104.2 |

Note: Values in brackets are for a reaction time of 28 min.
*THFI = tetrahydrofuran insolubles

We claim:

1. A process for producing a highly dispersed hydrogenation catalyst which comprises forming an aqueous solution of a salt of a transition metal and a commercial ionic or non-ionic surfactant, adding said solution to heated petroleum pitch or a mixture of petroleum pitch and petroleum distillate and mixing vigorously until a stable water-in-oil micro-emulsion is formed having an average droplet diameter of less than about 1500 Å, and heating said micro-emulsion in the presence of a hydrogenatable organic feedstock and hydrogen at hydrogenation conditions to produce catalyst particles having an average size of less than about 500 Å.

2. A process according to claim 1 wherein the aqueous solution is also heated to about the same temperature as the petroleum pitch or mixture of petroleum pitch and petroleum distillate.

3. A process according to claim 1 wherein the petroleum distillate is heavy gas oil.

4. A process according to claim 3 wherein the aqueous solution and petroleum pitch/heavy gas oil mixture are both heated to about 100° C.

5. A process according to claim 3 wherein the petroleum pitch and heavy gas oil are mixed in proportions to provide a density approximately equal to that of the aqueous solution.

6. A process according to claim 1 wherein the aqueous solution contains up to about 1% by weight of surfactant, relative to the total weight of micro-emulsion.

7. A process according to claim 1 wherein the surfactant consists of long aliphatic (lipophilic) and short hydroxy (hydrophilic) moieties.

8. A process according to claim 5 wherein the petroleum pitch and heavy gas oil are mixed in the proportions 1.0:0.5 to 1.0:2.0.

9. A process according to claim 6 wherein the aqueous solution contains about 1 to 15% by weight of transition metal salt and 0.05 to 1.5% by weight of catalyst promoters.

10. A process according to claim 9 wherein the transition metal salt is selected from salts of molybdenum, vanadium, nickel, iron and zinc.

11. A process according to claim 10 wherein the catalyst contains promoter which is an acidic compound selected from phosphoric acid, sulphuric acid and potassium dichromate or a sulphur donor.

12. A process according to claim 11 wherein the sulphur donor is selected from elemental sulphur, hydrogen, sulphide, dimethylsulphoxide and thioacetanilide.

13. A process according to claim 1 wherein the catalyst particles have an average particle size of less than 300 Å.

14. A highly dispersed hydrogenation catalyst which comprises a stable water-in-oil micro-emulsion containing as the oil component petroleum pitch or a mixture of petroleum pitch and petroleum distillate and containing as the catalyst component a salt of a transition metal, said micro-emulsion having an average droplet diameter of less than about 1500 Å, and said micro-emulsion being adapted to produce catalyst particles having an average particle size of less than about 500 Å when heated in the presence of a hydrogenatable organic feedstock and hydrogen at hydrogenatable conditions.

15. A catalyst according to claim 14 wherein the petroleum distillate is heavy gas oil.

16. A catalyst according to claim 15 wherein the petroleum pitch and heavy gas oil are in the proportions 1.0:0.8 to 1.0:1.2.

17. A catalyst according to claim 15 containing about 0.1 to 2% by weight of transition metal salt relative to the total weight of micro-emulsion.

18. A catalyst according to claim 14 wherein said average particle size is less than 300 Å.

* * * * *